(12) United States Patent
Harris et al.

(10) Patent No.: US 6,360,592 B1
(45) Date of Patent: Mar. 26, 2002

(54) DETECTION AND IDENTIFICATION OF PRESSURE-SENSOR FAULTS IN ELECTRO-HYDRAULIC (EHB) BRAKING SYSTEMS

(75) Inventors: Alan Leslie Harris, Coventry; Mark Leighton Howell, Leamington Spa; Mark Ian Phillips, Birmingham, all of (GB)

(73) Assignee: Lucas Industries public limited company (GB)

( * ) Notice: Subject to any disclaimer, the term of this patent is extended or adjusted under 35 U.S.C. 154(b) by 0 days.

(21) Appl. No.: 09/448,115

(22) Filed: Nov. 24, 1999

(30) Foreign Application Priority Data

Nov. 27, 1998 (GB) .............................................. 9825891

(51) Int. Cl.⁷ ................................................. G01L 5/28
(52) U.S. Cl. ...................................................... 73/121
(58) Field of Search ........................... 303/15, 92, 100, 303/111, 118, 119, 122.12, 122.14, 113.4, 115.4, 84.2; 188/1.11, 72.1, 158; 73/121, 714

(56) References Cited

U.S. PATENT DOCUMENTS 5,004,299 A   4/1991  Brearley et al. ............... 303/15
5,125,483 A   6/1992  Kitagawa et al. ............ 188/158
5,779,328 A   7/1998  Mergenthaler et al.  303/122.12
5,941,608 A   8/1999  Campau et al. ........... 303/113.4

*Primary Examiner*—William Oen
(74) *Attorney, Agent, or Firm*—MacMillan, Sobanski & Todd, LLC

(57) ABSTRACT

A method of detection and identification of pressure sensor faults in an electro-hydraulic braking system of the type comprising a brake pedal, respective braking devices connected to the vehicle wheels and which communicate with electronically controlled proportional control valves in order to apply hydraulic fluid under pressure to the braking devices, respective pressure sensors for measuring the hydraulic pressures at the individual braking devices, a hydraulic pump driven by an electric motor, a high pressure hydraulic pressure accumulator fed by the pump for the provision of hydraulic fluid under pressure which can be passed to the braking devices via the proportional control valves in order to apply hydraulic fluid under pressure to the braking devices in proportion to the driver's braking demand as sensed at the brake pedal, and a supply pressure sensor for monitoring the hydraulic pressure supplied to the electronically controlled proportional control valves. In accordance with the method, three or more of the pressure sensors are arranged to be subjected to the same pressure and their readings measured and compared whereby to identify a sensor whose reading does not correspond to that of the others.

15 Claims, 3 Drawing Sheets

NOTE: INTER-AXLE TEST CAN BE EITHER BETWEEN FRONT AND REAR SENSORS AT THE SAME SIDE OF THE VEHICLE, OR ELSE BETWEEN DIAGONALLY OPPOSED SENSORS

E.G. IF 'DETECTION' FLAG ALREADY SET FOR FRONT AXLE, AND INTER-AXLE TEST FAILS FOR SIDE OR DIAGONAL WHICH INCLUDES FRONT-LEFT SENSOR, THEN SET DIAGNOSIS FLAG FOR FRONT-LEFT SENSOR.

DETECTION AND IDENTIFICATION OF PRESSURE-SENSOR FAULTS IN ELECTRO-HYDRAULIC (EHB) BRAKING SYSTEMS

CROSS-REFERENCE TO RELATED APPLICATIONS

This application claims priority to co-pending United Kingdom Patent Application No. 9825891.6

BACKGROUND OF THE INVENTION

The present invention is concerned with the detection and identification of pressure sensor faults within the context of electro-hydraulic (EHB) braking systems.

A typical EHB system for a vehicle comprises a brake pedal, respective braking devices connected to the vehicle wheels and which are capable of being brought into communication with electronically controlled proportional control valves in order to apply hydraulic fluid under pressure to the braking devices, a hydraulic pump driven by an electric motor, and a high pressure hydraulic pressure accumulator fed by said pump for the provision of hydraulic fluid under pressure which can be passed to the braking devices via the proportional control valves in order to apply hydraulic fluid under pressure to the braking devices in so called "brake by wire" mode in proportion to the driver's braking demand as sensed at the brake pedal.

The EHB system is controlled by an electronic controller (ECU) which, inter alia, controls the hydraulic pump to keep the pressure in the hydraulic pressure accumulator within specified limits.

The hydraulic pressure supplied to the electronically controlled valves (the "supply pressure") is monitored by a supply pressure sensor. The hydraulic pressure at the various braking devices is measured by individual pressure sensors at these braking devices. An isolating valve is included whereby the hydraulic pressure accumulator can be selectively isolated from the pump and the remainder of the system.

Pressure sensors are key components of such EHB systems, being used in the process of controlling pressure as well as in the detection of system faults. Pressure sensors of the type in question convert hydraulic pressure into electrical signals which are supplied to the system's ECU for control purposes. If one of these sensors develops a fault, such that incorrect signals are supplied to the ECU, then control errors could result. Incorrect pressure readings therefore have the potential to cause uncomfortable and/or inconsistent control of the normal braking function, to impair the efficiency of control systems such as ACC (Autonomous Cruise Control) or ABS, to trigger false warnings of system failure, or to overlook the occurrence of genuine system faults. For these reasons one wishes to detect even relatively small sensor errors so that effects such as the above can be mitigated by effective countermeasures.

Some types of fault can be detected by the sensor's individual on-board electronics, but others are most easily (and economically) found by comparison with the signals of another sensor subjected to the same hydraulic pressure. Sensor duplication is, however, uneconomic.

It is therefore one object of the present invention to enable faults to be detected and identified by sensor signal comparison but without requiring sensor duplication.

In accordance with the present invention, three or more pressure sensors are arranged to be subjected to the same pressure and their readings measured and compared whereby to identify a sensor whose reading does not correspond to that of the others.

Preferably, in the case of a four or more wheeled vehicle, all pressure sensors associated with the braked wheels, and the supply pressure sensor, are connected together, with all of the proportional control valves opened fully or substantially fully.

In one test arrangement, with the vehicle stationary and the accumulator isolating valve open, a comparison of the readings from all sensors is made under pressure.

In an alternative test arrangement, the comparison of the sensor readings is made with the vehicle stationary and the accumulator isolating valve closed.

The invention is described further hereinafter, by way of example only, with reference to the accompanying drawings.

DETAILED DESCRIPTION OF THE INVENTION

Figure 1:
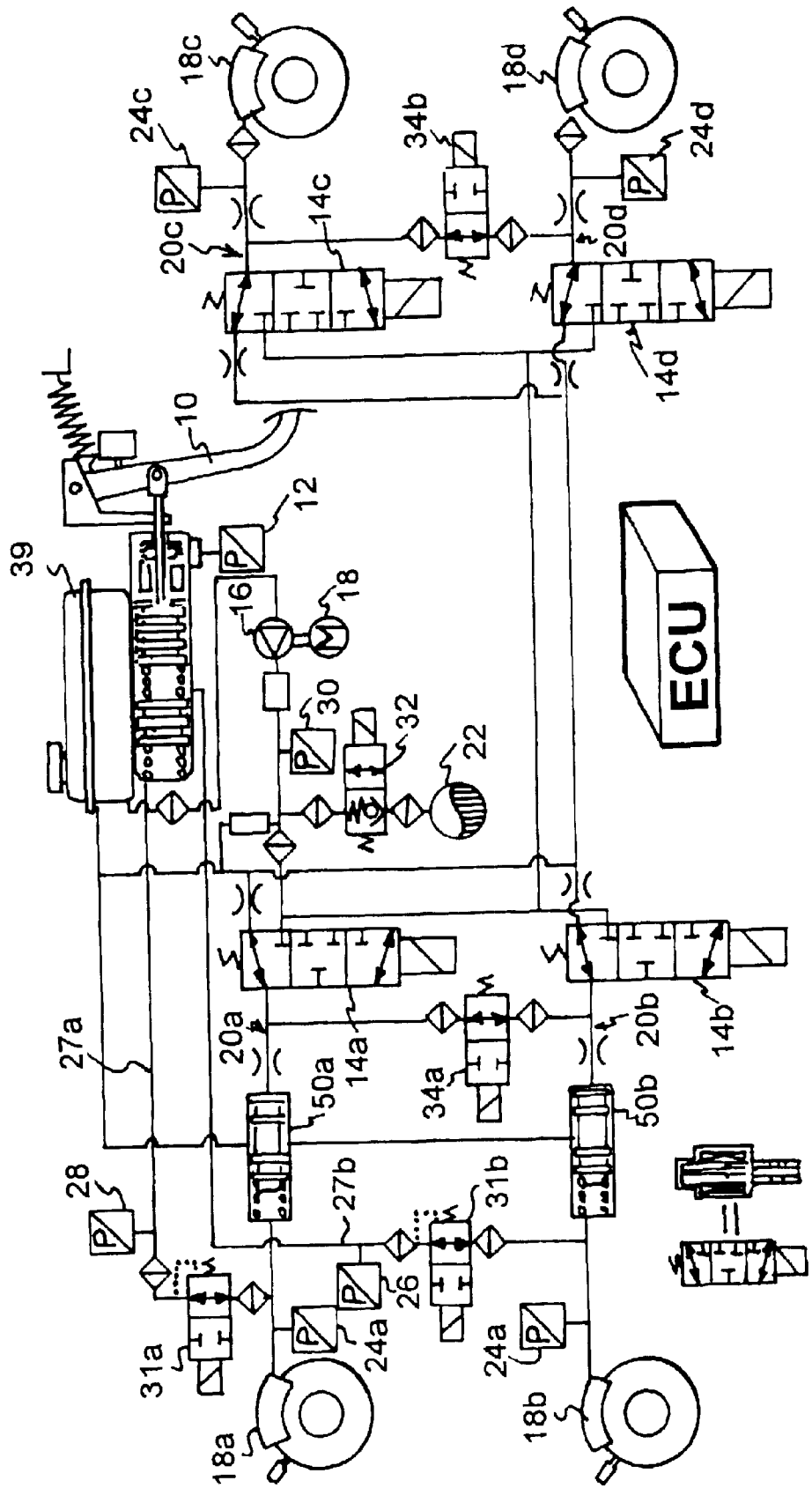
FIG. 1 is a schematic illustration of one embodiment of an electro-hydraulic braking system to which the present invention is applicable.

Referring first to FIG. 1, the illustrated EHB system comprises a brake pedal 10 with an associated sensor 12 for the acquisition of the driver's braking demand. The driver's demand is transferred to an electronic control unit (ECU), evaluated there, and used as the source for the generation of electrical control signals for proportional solenoid control valves 14a, 14b, 14c, 14d, a hydraulic pump 16, wheel brakes 18a, 18b of one axle supplied with hydraulic fluid by electrically actuated brake channels 20a, 20b and wheel brakes 18c, 18d of the other axle supplied by electrically actuated channels 20c, 20d.

Under normal braking conditions, brake pressure modulation in the electrically actuated brake channels 20a, 20b, 20c, 20d is effected in a known manner by means of the proportional solenoid control valves 14a, 14b, 14c and 14d, the brake pressure being provided by a pressure accumulator/reservoir 22 whose pressure is maintained by the pump 16 operated by an electric motor 18.

Pressure sensors 24a and 24b monitor by hydraulic pressure at the wheel brakes 18a, 18b of the front axle and pressure sensors 24c and 24d monitor the hydraulic pressure at the wheel brakes 18c, 18d of the rear axle. Further pressure sensors 26, 28 monitor the pressure within push-through circuits 27a, 27b for the right and left front wheel brakes and a pressure sensor 30 monitors the supply pressure in the circuit of pump 16.

The operation of the aforegoing system is briefly as follows.

The accumulator 22 is maintained by the pump 16 within a specified pressure range, as observed by the supply-pressure sensor 30. Braking demands by the driver result in actuation of the proportional solenoids 14 associated with each wheel. Energisation current will be increased if the pressure observed by the associated sensor 24 is less than that demanded, and reduced if it is greater than the demanded pressure. The normal requirement will be for identical pressures to be present at the left and right wheels of each axle, but the pressures at the front and rear axles, may well be different in order to match the desired braking distribution. For this type of braking the master-cylinder isolation valves 31a, 31b will be closed, the accumulator's isolation valve 32 will be open, and the cross-axle-balance valves 34a, 34b can each be opened to ensure pressure equality left-to-right. However, some operating modes require individual control of the pressure at each wheel, e.g. during ABS or transverse pressure apportioning, and the cross-axle-balance valves 34a, 34b will be closed at such times.

This hydraulic layout has been devised in order to permit most sensors to be compared with at least one other sensor under most operating conditions. For example, the pressure signalled at the front left wheel can be compared with that signalled at the front right wheel whenever the front-axle balance valve is open, and the sensors for the master-cylinder's primary and secondary circuits are normally subjected to the similar pressures.

However, comparison of at least three sensor signals is necessary in order to diagnose which signal is incorrect. Mere knowledge that a fault exists is insufficient for situations which require a fault-management (fall-back) strategy to be adopted. Also there is no convenient partner for the supply-pressure sensor 30.

Thus, for example, whenever the balance valves 34a, 34b are open it is possible to detect errors by comparing the sensor readings from opposite ends of each axle, e.g. front left with front right. However this does not identify which sensor is in error, so any fault management strategies triggered by this test must take this uncertainty into account. If more effective strategies are required then the diagnosis must be more specific.

A similar situation exists for the accumulator pressure sensor 30. During pump operation, one can compare the sensor signal with a signal representing motor torque (proportional to pump delivery pressure) which can be obtained from observations of the motor behaviour, but this will not identify whether the fault is in the sensor or the motor.

Likewise during periods without braking, all four brake pressure sensors 24a, 24b, 24c, 24d will be connected to the reservoir 39 and it is possible to compare their signals at zero pressure, but this will not capture faults which are only apparent under pressure. Also, the pressure at the supply-pressure sensor 30 is uncertain at such times. If the accumulator isolating valve 32 is open then the supply-pressure sensor 30 will normally be at accumulator pressure if the valve is closed then it will be at some intermediate pressure due to inevitable pressure decay via internal leakage at the proportional control valves 14.

The hydraulic layout of the system of FIG. 1 provides a solution to these problems in that all four brake pressure sensors 24a, 24b, 24c, 24d are connected together and to the supply pressure sensor 30, if all of the proportional valves 14a, 14b, 14c, 14d are opened fully.

This arrangement provides for the following test possibilities.

1. Open all proportional valves (14a to 14d) with accumulator valve (32) open.

This allows detection of zero drift and gain errors, including those which might be caused by a sharp change (knee) part way along the sensor's characteristic of pressure to voltage. However, the high pressure reached (accumulator pressure) mean that there are issues of safety and reliability. This, for example, with the vehicle stationary and accumulator isolating valve 32 open, a five-sensor (the four brake pressure sensors 24 and the supply pressure sensor 30) comparison is possible under pressure. The high pressure involved will means however, that frequent checks in this manner could lead to premature caliper failure due to fatigue. The test is thus useful for diagnosis, once a fault has been detected by other means (e.g. the routine cross-axle check as described hereinafter with reference to FIG. 3) and could form part of a system-initialisation check but is not suitable for frequently invoked fault detection. It must be made sure that this test is only used when the vehicle is stationary. The main use of this test would be:

to diagnose brake-pressure sensor faults already detected, so that the correct fault-management procedure can be implemented, to detect and diagnose accumulator pressure sensor faults.

2. Open all proportional valves (14a to 14d) with accumulator valve (32) closed.

This improves the safety and reliability concerns associated with 1 and can be used routinely every time the vehicle comes to rest. It can therefore diagnose faults already detected (by the simple cross-axle comparison test) at the earliest possible moment after detection. Such a test can be used frequently and has the additional advantage that it can use a range of pressures depending upon the brake pressure used for that stop, so that sensor abnormalities in the normal working range are more easily noted.

However, because end-of-stop pressure is not usually very high (rarely>30 bar) this test is not effective for faults which occur only at higher pressures, e.g. a knee in the pressure/voltage characteristic.

3. Cross-axle and inter-axle sensor (24a to 24d) plausibility check with seal-friction offset.

This is a method of diagnosing which brake pressure is faulty by comparing the pressures across the axle and between the front and rear axles. This may appear to be a straight forward exercise to perform. However systems with isolating pistons (50a, 50b) for the push-through circuit have special problems because of the seal friction.

Comparing pressure signals across the axle is straightforward under the assumption that the friction at each piston is the same. When operating in "one-valve-in-hold" mode there will be a pressure drop across the balance valve during rapid pressure rise or dump, but any difference during slow rates of pressure change will be due to sensor errors.

Diagnosis requires a comparison between more than two sensors, but the seal friction of the isolating pistons complicates an inner-axle plausibility check. Seal friction can be as much as 6 bar which is larger than the errors which should be detected. However when the pressure is changing it becomes possible to diagnose small errors if the friction effect is taken into account.

Figure 2:
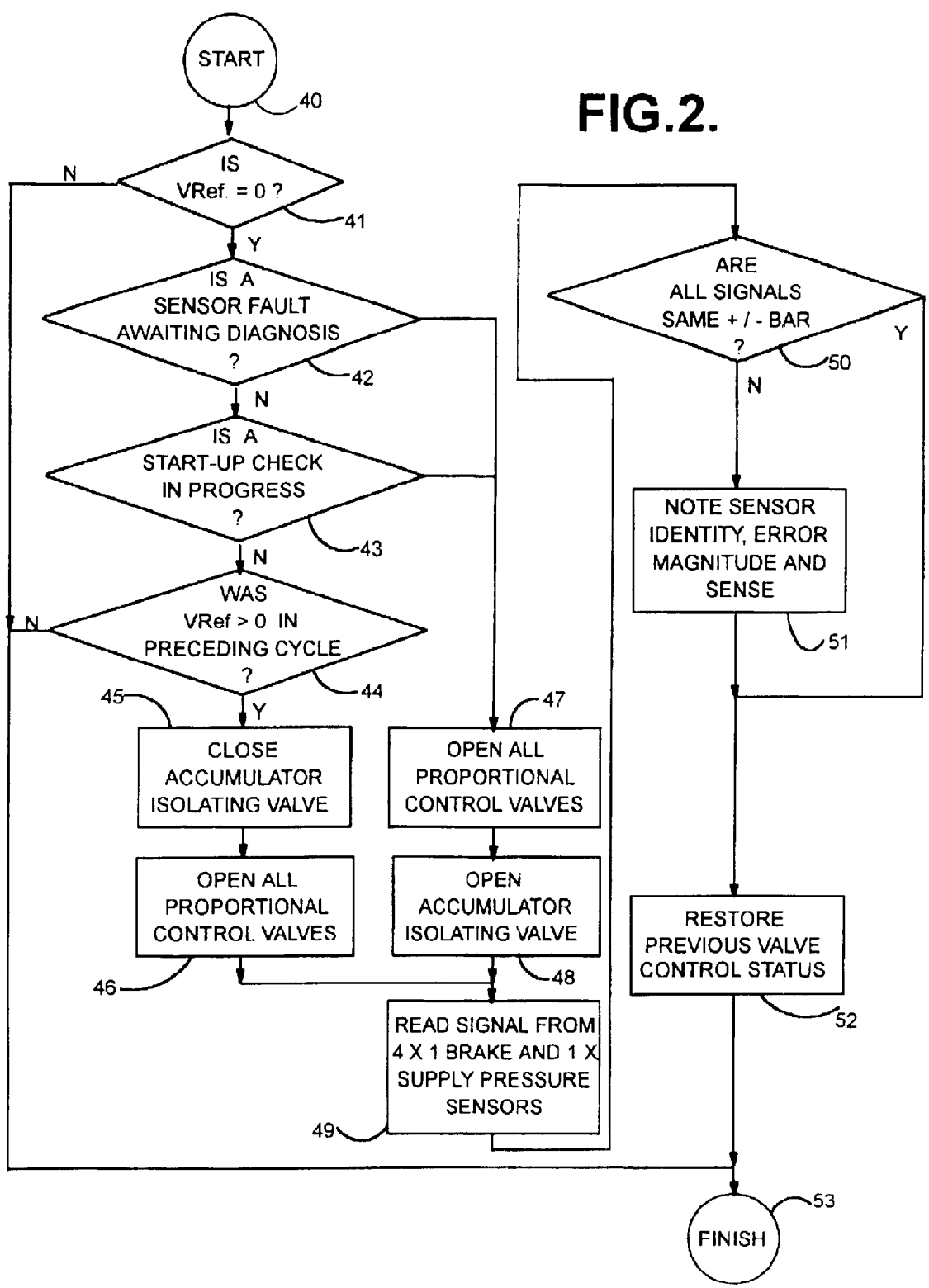
FIG. 2 is a sequence flow diagram illustrating one embodiment of a system for detection and identification of sensor faults.

Depending upon the sense of the error (+ve or−ve) it may not be recognised until the demand pressure changes by an amount greater than the seal friction. This technique can be used with any of 1. or 2. described above. FIG. 2 is a sequence flow chart illustrating the aforegoing two options 1 and 2.

FIG. 2 includes the following sequence steps

40 —start

41 —Is $V_{ref}$=0?

42 —Is a sensor fault awaiting diagnosis?

43 —Is start-up check in progress?

44 —Was $V_{ref}$>0 in preceding cycle?

Figure 3:
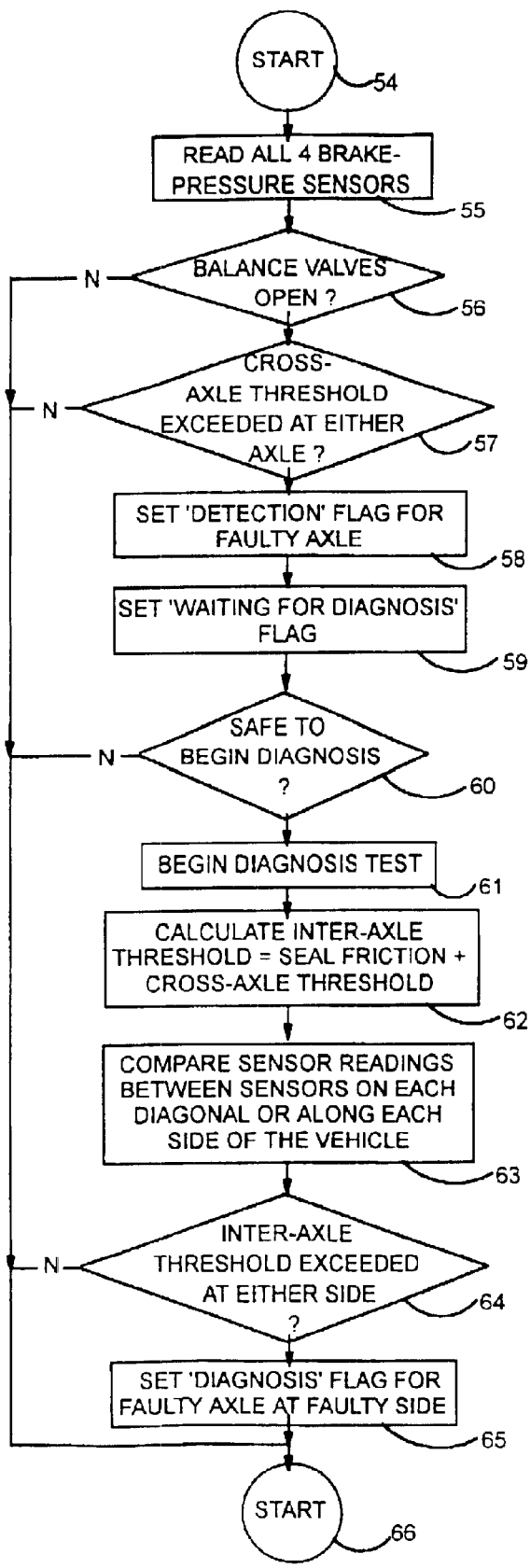
FIG. 3 is a sequence flow diagram illustrating one technique for detecting but not identifying the presence of a faulty sensor.

45 —Close accumulator isolating valve
46 —Open all proportional control valves
47 —Open all proportional control valves
48 —Open accumulator isolating valve
49 —Read signal from 4×brake and 1×supply pressure sensors
50 —Are all signals same +/xbar?
51 —Note sensor identity, error magnitude and sense
52 —Restore previous valve control status
53 —Finish An example of a brake pressure sensor plausibility check to establish whether a faulty brake pressure sensor exists (but which is unable to identify which particular sensor is faulty) is illustrated in FIG. 3. FIG. 3 includes the following sequence steps:

54 —Start
55 —Read all 4 brake pressure sensors
56 —Balance valves open?
57 —Cross-axle threshold exceeded at either axle?
58 —Set "detection" flag for faulty axle
59 —Set "waiting for diagnosis" flag
60 —Safe to begin diagnosis?
61 —Begin diagnosis test
62 —Calculate inter axle threshold=seal friction+cross axle threshold
63 —Compare sensor readings between sensors on each diagonal or along each side of the vehicle
64 —Inter-axle threshold exceeded at either side?
65 —Set "diagnosis" flag for faulty axle at faulty side
66 —Start

What is claimed is:

1. A method of detection and identification of pressure sensor faults in an electro-hydraulic braking system of the type comprising a brake pedal, respective braking devices connected to the vehicle wheels and which communicate with electronically controlled proportional control valves in order to apply hydraulic fluid under pressure to the braking devices, respective pressure sensors for measuring the hydraulic pressures at the individual braking devices, a hydraulic pump driven by an electric motor, a high pressure hydraulic pressure accumulator fed by said pump for the provision of hydraulic fluid under pressure which can be passed to the braking devices via the proportional control valves in order to apply hydraulic fluid under pressure to the braking devices in proportion to the driver's braking demand as sensed at the brake pedal, and a supply pressure sensor for monitoring the hydraulic pressure supplied to the electronically controlled proportional control valve, in which method at least three of said pressure sensors are arranged to be subjected to the same pressure and their readings measured and compared whereby to identify a sensor whose reading does not correspond to that of the others.

2. A method according to claim 1, wherein the case of a vehicle having at least four or more wheels, all pressure sensors associated with the braked wheels, and the supply pressure sensor, are connected together, with all of the proportional control valves either one of opened fully and substantially fully.

3. A method according to claim 1, wherein with the vehicle stationary and an accumulator isolating valve open, a comparison of the readings from all sensors is made under pressure.

4. A method according to claim 2, wherein with the vehicle stationary and an accumulator isolating valve open, a comparison of the readings from all sensors is made under pressure.

5. A method according to claim 1, wherein the comparison of the sensor readings is made with the vehicle stationary and an accumulator isolating valve closed.

6. A method according to claim 2, wherein the comparison of the readings from all sensors is made under pressure.

7. A method according to claim 1, wherein a comparison is made of the brake pressures as measured by the pressure sensors, both across the axles and between front and rear axles.

8. An electro-hydraulic braking system comprising a brake pedal, respective braking devices connected to the vehicle wheels and which communicate with electronically controlled proportional control valves in order to apply hydraulic fluid under pressure to the braking devices, respective pressure sensors for measuring the hydraulic pressures at the individual braking devices, a hydraulic pump driven by an electric motor, a high pressure hydraulic pressure accumulator fed by said pump for the provision of hydraulic fluid under pressure which can be passed to the braking devices via the proportional control valves in order to apply hydraulic fluid under pressure to the braking devices in proportion to the driver's braking demand as sensed at the brake pedal, a supply pressure sensor for monitoring the hydraulic pressure supplied to the electronically controlled proportional control valves, and sensor control and comparison means for subjecting at least three of said pressure sensors to the same pressure and measuring and comparing their readings so as to identify a sensor whose reading does not correspond to that of the others.

9. A system according to claim 8, wherein in the case of a vehicle having at least four wheels, the control means can connect together all pressure sensors associated with the brake wheels, and the supply pressure sensor, with all of the proportional control valves either one of opened fully and opened substantially fully.

10. A system according to claim 8, wherein, with the vehicle stationary and an accumulator isolating valve open, the control means is arranged to effect a comparison of the readings from all sensors under pressure.

11. A system according to claim 9, wherein with the vehicle stationary and an accumulator isolating valve open, the control means is arranged to effect a comparison of the readings from all sensors under pressure.

12. A system according to claim 8, wherein said control means is arranged to effect the comparison of the sensor readings with the vehicle stationary and an accumulator isolating valve closed.

13. A system according to claim 9, wherein said control means is arranged to effect comparison of the sensor readings with the vehicle stationary and an accumulator isolating valve closed.

14. A system according to claim 8, wherein the control means is arranged to effect a comparison of the brake pressures as measured by the pressure sensors, both across the axles and between front and rear axles.

15. A system according to claim 8, wherein said control means comprises a system ECU.

* * * * *